United States Patent
Fellner et al.

(10) Patent No.: US 10,615,408 B1
(45) Date of Patent: Apr. 7, 2020

(54) HYBRID PRIMARY LITHIUM BATTERY

(71) Applicant: Government of the United States, as represented by the Secretary of the Air Force, Wright-Patterson AFB, OH (US)

(72) Inventors: Joseph P. Fellner, Kettering, OH (US); Max Tsao, Springboro, OH (US)

(*) Notice: Subject to any disclaimer, the term of this patent is extended or adjusted under 35 U.S.C. 154(b) by 108 days.

(21) Appl. No.: 15/903,539

(22) Filed: Feb. 23, 2018

(51) Int. Cl.
| H01M 4/36 | (2006.01) |
| H01M 4/583 | (2010.01) |
| H01M 6/16 | (2006.01) |
| H01M 4/60 | (2006.01) |
| H01M 4/62 | (2006.01) |
| H01M 4/38 | (2006.01) |
| H01M 4/02 | (2006.01) |

(52) U.S. Cl.
CPC .......... *H01M 4/364* (2013.01); *H01M 4/382* (2013.01); *H01M 4/5835* (2013.01); *H01M 4/60* (2013.01); *H01M 4/622* (2013.01); *H01M 4/625* (2013.01); *H01M 6/16* (2013.01); *H01M 2004/028* (2013.01); *H01M 2220/30* (2013.01)

(58) Field of Classification Search
None
See application file for complete search history.

(56) References Cited

U.S. PATENT DOCUMENTS

| 3,536,532 A | 10/1970 | Watanabe et al. |
| 3,700,502 A | 10/1972 | Watanabe et al. |
| 3,892,590 A | 7/1975 | Gunther |
| 4,251,607 A | 2/1981 | Yamaki et al. |
| 4,681,823 A | 7/1987 | Tung et al. |
| 6,451,483 B1* | 9/2002 | Probst ............... H01M 4/043 29/623.1 |
| 9,147,874 B2 | 9/2015 | Chen et al. |
| 2005/0227146 A1* | 10/2005 | Ghantous ........... H01M 4/381 429/231.7 |

(Continued)

OTHER PUBLICATIONS

Fellner, Initial Investigations on the Use of Coated Phthalocyanines for Very High Energy Density Rechargeable Lithium-Based Batteries, ECS Transactions, 66 (9) 139-146 (2015).

(Continued)

*Primary Examiner* — Wojciech Haske
(74) *Attorney, Agent, or Firm* — AFMCLO/JAZ; Timothy M. Barlow

(57) ABSTRACT

A hybrid battery is provided that includes a cathode active material containing a carbon fluoride material and a phthalocyanine compound, an anode active material consisting of lithium metal, a lithium alloy, or a combination thereof; and a porous separator interposed between the cathode active material and the anode active material. The carbon fluoride material has a carbon to fluoride ratio of about 0.5 to about 3.0, and the phthalocyanine compound has an average particle size in a range from greater than 50 nm to less than about 500 nm. A weight ratio between the carbon fluoride material and the phthalocyanine compound is between about 1:20 to about 20:1. The performance (e.g., rate and discharge capacity) of this hybrid primary lithium battery is significantly enhanced.

12 Claims, 10 Drawing Sheets

(9 of 10 Drawing Sheet(s) Filed in Color)

(56) References Cited

U.S. PATENT DOCUMENTS

| | | | |
|---|---|---|---|
| 2013/0330611 A1* | 12/2013 | Chen | B82Y 30/00 |
| | | | 429/211 |
| 2014/0178750 A1 | 6/2014 | Anji Reddy et al. | |
| 2014/0186713 A1* | 7/2014 | Chen | H01M 4/133 |
| | | | 429/231.7 |
| 2016/0133932 A1 | 5/2016 | Liang et al. | |
| 2016/0226063 A1 | 8/2016 | Nishimura et al. | |
| 2016/0344039 A1 | 11/2016 | Sano et al. | |

OTHER PUBLICATIONS

Varta, Primary Lithium Cells, www.varta-microbattery.com.
Read, Performance Evaluation of Commercial CFx Materials in Lithium Batteries, 2009.
Daikin Fluorochemicals product information, https://daikin-america.com/wp-content/uploads/2013/07/CFx-Brochure-9-12.pdf (2013).
NASA Technical memorandum 100156, https://ntrs.nasa.gov/archive/nasa/casi.ntrs.nasa.gov/19870016799.pdf (1987).
Li, Y.R., Hybrid Ag2VO2PO4/CFx as a High Capacity and Energy Cathode for Primary Batteries, Journal of the Electrochemical Society, 164 (12) A2457-A2467 (2017).
Gomadam, P.M., Modeling Li/CFx-SVO Hybrid-Cathode Batteries, Journal of the Electrochemical Society, 154 (11) A1058-A1064 (2007).
Peng, S., Fluorinated graphene/sulfur hybrid cathode for high energy and high power density lithium primary batteries, RSC Adv., 2018, 8, 12701-12707.
Wei, C., Recent progress in hybrid cathode materials for lithium ion batteries, NewJ.Chem., 2016, 40, 2984.

* cited by examiner

US 10,615,408 B1

HYBRID PRIMARY LITHIUM BATTERY

RIGHTS OF THE GOVERNMENT

The invention described herein may be manufactured and used by or for the Government of the United States for all governmental purposes without the payment of any royalty.

Pursuant to 37 C.F.R. § 1.78(a)(4), this application claims the benefit of and priority to prior filed Provisional Application Ser. No. 62/469,188, filed 9 Mar. 2017, which is expressly incorporated herein by reference.

FIELD OF THE INVENTION

The present invention generally relates to the field of electrochemical cells, and more particularly to electrochemical cells comprising a cathodic mixture of fluorinated carbon materials and phthalocyanine, and methods of making same.

BACKGROUND OF THE INVENTION

Lithium batteries stand apart from other batteries in their high charge density and long shelf life. Depending on the chemical makeup of the anode and cathode materials, lithium batteries may be primary (not rechargeable) or secondary (rechargeable) batteries. Lithium batteries are commonly used in portable consumer electronic applications, cardiac pacemakers, and various military and aerospace electronic applications.

In addition to the high cost per unit of lithium batteries, and depending on the specific type of battery, other limitations and/or drawbacks exist. For example, one limitation for a primary lithium battery using Li-CFx as the primary cathode active material (e.g., BR1225 or BR2325) is that the capacity of the active material is about 865 milliamp-hours per gram (mAh/g). Additionally, limitations associated with just using a phthalocyanine-based compound as the cathode active material are the low rate capability and high capacities (>1200 mAh/g) observed only at very low discharge rates.

Therefore, a need exists for new lithium batteries that overcome one or more of the problems of the prior art.

SUMMARY OF THE INVENTION

The present invention overcomes one or more of the foregoing problems and other shortcomings, drawbacks, and challenges of existing primary lithium batteries. While the invention will be described in connection with certain embodiments, it will be understood that the invention is not limited to these embodiments. To the contrary, this invention includes all alternatives, modifications, and equivalents as may be included within the spirit and scope of the present invention.

In accordance with an embodiment of the present invention, a hybrid lithium primary battery is provided. The hybrid battery comprises a cathode active material consisting essentially of a carbon fluoride material and a phthalocyanine compound, wherein the carbon fluoride material has a carbon to fluoride ratio of about 0.5 to about 3.0, wherein the phthalocyanine compound has an average particle diameter in a range from about 50 nm to about 500 nm, and wherein a weight ratio between the carbon fluoride material and the phthalocyanine compound is between about 1:20 to about 20:1. The hybrid battery also includes an anode active material consisting of lithium metal, a lithium alloy, or a combination thereof; and a porous separator interposed between the cathode active material and the anode active material. The rate and discharge capacity of this hybrid battery is significantly enhanced relative to a Li-CFx primary battery void of any phthalocyanines.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawing, which are incorporated in and constitute a part of this specification, illustrate embodiments of the invention and, together with a general description of the invention given above, and the detailed description given below, serve to explain the invention. It will be appreciated that, for purposes of clarity and where appropriate, reference numerals have been repeated in the figures to indicate corresponding features.

DETAILED DESCRIPTION OF THE INVENTION

Figure 1:
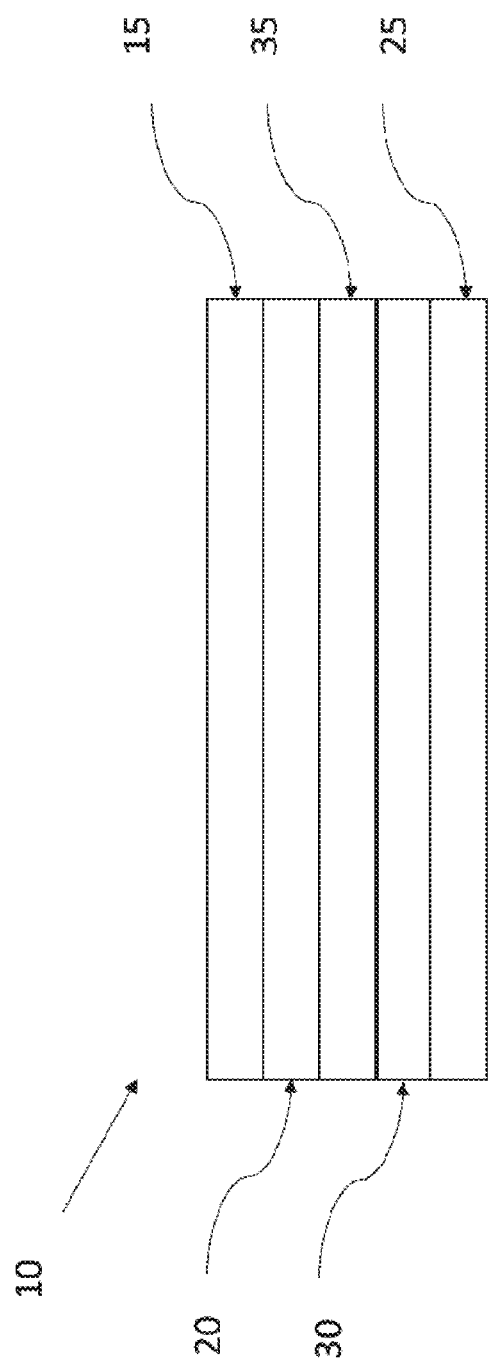
FIG. 1 is a schematic cross-sectional view showing various component layers of a coin-type lithium primary battery, in accordance with an exemplary embodiment of the present invention.

FIG. 1 shows a longitudinal sectional view of a coin-type lithium primary battery 10, in accordance with one exemplary embodiment of the present invention. The coin-type lithium primary battery 10 includes a positive terminal 15 in electrical contact with a cathode active material 20, a negative terminal 25 in electrical contact with an anode active material 30, and a porous separator 35 interposed between the cathode active material and the anode active material.

The positive and negative terminals 15, 25 are not particularly limited to any particular materials, so long as the material utilized is conductive and compatible with the materials directly in contact therewith. Exemplary conductive materials include titanium or stainless steel.

The cathode active material 20 is a synergistic combination of a carbon fluoride material and a phthalocyanine compound. The cathode active material 20 may further include a conductive additive and/or a binder.

In accordance with an aspect of the present invention, the carbon fluoride ($CF_x$) material has a carbon to fluoride (C:F) ratio of about 0.5 to about 3.0, i.e., x is in a range from about 0.5 to about 3.0. For example, the C:F ratio may be about 0.5, about 0.6, about 0.75, about 0.9, about 1.0, about 1.25, about 1.5, about 1.75, about 2.0, about 2.25, about 2.5, about 2.75, about 3.0, or in a range between any two of the foregoing.

In an embodiment, the carbon fluoride material comprises a carbon monofluoride material having a C:F ratio of about 0.95 to about 1.15. For example, the C:F ratio may be about 0.95, about 0.98, about 1.0, about 1.02, about 1.05, about 1.1, about 1.15, or in a range between any two of the foregoing. An alternative expression of the degree of fluorination may be in weight percent of fluorine. For example, the degree of fluorination may be about 58.2 wt % F to about 70.3 wt % F (e.g., about 59.5 wt % F, about 61.1 wt % F, or about 64.5 wt % F, about 67.0 wt % F, or about 69.5 wt % F). An exemplary carbon monofluoride material ($CF_x$) is commercially available from Sigma-Aldrich (graphite, fluorinated, polymer).

In accordance with another aspect of the present invention, the phthalocyanine compound has an average particle diameter which may be in a range from about 50 nm to about 500 nm. For example, the average particle diameter may be about 50 nm, about 75 nm, about 100 nm, about 150 nm, about 200 nm, about 250 nm, about 300 nm, about 350 nm, about 400 nm, about 450 nm, about 500 nm, or within a range between any two of the foregoing. Non-limiting exemplary phthalocyanine compounds include copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganese phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, or any combination thereof. In an embodiment, the phthalocyanine compound comprises copper phthalocyanine, which may be commercially available from Sigma Aldrich, St. Louis, Mo. To achieve the desired average particle diameter, a sample of the phthalocyanine may be dried (e.g., elevated temperature under vacuum), and subjected to a particle size reduction process, such as high-intensity ball milling.

In accordance with embodiments of the present invention, a weight ratio between the carbon monofluoride material ($CF_x$) and the phthalocyanine compound (Pc) is between about 1:20 to about 20:1. For example, the $CF_x$:Pc ratio may be about 1:20, about 1:18, about 1:15, about 1:13, about 1:10, about 1:8, about 1:5, about 1:3, about 1:2, about 1:1, about 2:1, about 3:1, about 5:1, about 8:1, about 10:1, about 13:1, about 15:1, about 18:1, about 20:1, or within a range between any two of the foregoing.

The cathode active material 20 may further comprise a conductive additive. The conductive additive should be compatible with other constituents in the cathode active material and not cause a chemical reaction in a potential range of the cathode active material during discharge. Non-limiting examples of suitable conductive additives include carbon black, acetylene black (AB), single-walled carbon nanotubes (SWCNT), multi-walled carbon nanotubes (MW-CNT), graphene, graphene oxide, or a combination of two or more thereof. The content ratio of the conductive additive in the cathode active material 20 is not particularly limited, and the ratio may be, for example, about 2 wt % to about 50 wt %, relative to entire weight of the cathode active material. For example, the conductive additive may be present in the cathode active material 20 in about 2 wt %, about 5 wt %, about 8 wt %, about 10 wt %, about 15 wt %, about 20 wt %, about 25 wt %, about 30 wt %, about 35 wt %, about 40 wt %, about 45 wt %, about 50 wt %, or in a range between any two of the foregoing.

The binder included in the cathode active material 20 includes one which does not cause a chemical change in a potential range of the cathode active material 20 during discharge. Specific examples thereof include fluororesins such as polyethylene oxide (PEO), styrene-butadiene rubber (SBR), polyethylene (PE), polyacrylic acid (PAA), polyvinylidene difluoride (PVDF), and the like. The cathode active material 20 may include about 1 wt % to about 15 wt % of the binder. For example, the binder may be present in the cathode active material 20 in about 1 wt %, about 2 wt %, about 5 wt %, about 7 wt %, about 10 wt %, about 12 wt %, about 15 wt %, or in a range between any two of the foregoing.

In accordance with an embodiment, the hybrid primary lithium battery 10 includes a cathode active material 20 comprising about 5 wt % to about 95 wt % of the carbon fluoride material; about 5 wt % to 95 wt % of the phthalocyanine compound; about 5 wt % to about 50 wt % of the conductive additive; and about 1 wt % to about 15 wt % of the binder, wherein wt % is based on a total weight of the carbon fluoride material, phthalocyanine compound, the conductive additive, and the binder.

The cathode active material 20 is formed by combining the carbon fluoride material and the phthalocyanine compound, and optionally, the conductive additive and/or the binder and mixed to homogenize, in the absence of or the presence of a liquid. An exemplary method of homogenizing the cathode active material includes mixture in a vial using a Wig-L-Bug® mixer. Once the desired degree of homogenization is achieved, the cathode active mixture may be dried (if applicable) and pressed into a desired shape, such as a disk-shaped pellet. But the hybrid primary lithium battery 10 is not limited thereto.

The anode active material 30 may comprise lithium metal, or a lithium alloy. For the lithium alloy, various lithium alloys known in the field of lithium primary batteries may be used. Examples of lithium alloys include aluminum (Al), tin (Sn), magnesium (Mg), indium (In), calcium (Ca), manganese (Mn), or the like. A metal that can be alloyed with lithium may be included alone in the lithium alloy. Alternatively, two or more metals may be included in the lithium alloy.

The physical properties and surface states of the lithium alloy can be improved as compared with those of metal lithium by appropriately adjusting the content of the metal to be alloyed with lithium. The content ratio of the metal to be alloyed with lithium is not particularly limited. For example, the non-lithium metal may be included in about 5 wt % or less, with respect to the total of the lithium alloy. In this range, the melting point or rigidity of the lithium alloy can be modified to the desired extent, thus improving the processability of anode active material 30.

The metal lithium and/or the lithium alloy is molded into any shape and thickness corresponding to the shapes, dimensions, specifications, and performance, and the like, of the hybrid primary lithium battery 10. Examples of the shape thereof include a sheet or a disk. Specifically, when the hybrid primary lithium battery 10 is a coin-type battery, such as that depicted in FIG. 1, the metal lithium and/or the lithium alloy may be molded into a disk shape having a diameter of about 3 mm to about 25 mm and a thickness of about 0.2 mm to about 2.0 mm.

For the porous separator 35, a porous membrane made of a material having resistance to the internal environment of a primary lithium battery can be used. Specific examples thereof include a nonwoven fabric made of synthetic resin, porous films (microporous films) made of synthetic resin, and the like. Examples of the synthetic resin used for the nonwoven fabric include polyethylene, polypropylene, polyphenylene sulfide, polybutylene terephthalate, and the like.

A thickness of a nonwoven fabric to be used for separator 35 is preferably 30 μm to 200 μm, and more preferably 60 μm to 100 μm. A thickness of a porous film to be used for separator 35 is preferably 6 μm to 30 μm. When the thickness of the nonwoven fabric or the porous film is within the disclosed ranges, the discharge characteristics can be easily maintained and a short circuit can be easily suppressed. The above-mentioned nonwoven fabric and porous film can be used alone. That is to say, when a nonwoven fabric is used as separator alone, the thickness of separator 35 may be 30 μm to 200 μm. When a porous film is used as separator 35 alone, the thickness of separator 35 may be 6 μm to 30 μm. Furthermore, a plurality of nonwoven fabrics or porous films of the same material type may be laminated, or a plurality of nonwoven fabrics or porous films of different material types may be combined. In addition, a nonwoven fabric and a porous film may be combined with each other. For example, a plurality of nonwoven fabrics and/or porous films may be laminated because an effect of suppressing a short circuit due to a pin-hole can be improved. The thickness of separator 35 in which a plurality of nonwoven fabrics and/or porous films are combined with each other is preferably 50 μm to 300 μm.

In order to facilitate or enhance ion transport across the porous separator 35, an electrolyte can be used. In an embodiment, a nonaqueous electrolyte is included in the hybrid primary lithium battery. The nonaqueous electrolyte may include a nonaqueous solvent and a solute dissolved in the nonaqueous solvent. For the nonaqueous solvent, various solvents known in the field of lithium primary batteries may be used. Specific examples thereof include α-butyrolactone, α-valerolactone, propylene carbonate (PC), ethylene carbonate, butylene carbonate, vinylene carbonate, vinyl ethylene carbonate, 1,2-dimethoxyethane (DME), 1,2-diethoxyethane, 1,3-dioxolane, dimethyl carbonate, diethyl carbonate, ethyl methylcarbonate, N,N-dimethylformamide, tetrahydrofuran, 2-methyltetrahydrofuran, dimethylsulfoxide, formamide, acetamide, dimethylformamide, acetonitrile, propionitrile, nitromethane, ethyl monoglyme, trimethoxymethane, dioxolane, dioxolane derivatives, sulfolane, methyl sulfolane, propylene carbonate derivatives, tetrahydrofuran derivatives, and the like. These may be used alone or in combination of two or more thereof. In another embodiment, the nonaqueous electrolyte may be substantially free of propylene carbonate.

For the solute (supporting salt) used in the nonaqueous electrolyte, various solutes known in the field of lithium primary batteries may be used. Specific examples thereof include lithium hexafluorophosphate ($LiPF_6$), lithium perchlorate ($LiClO_4$), lithium tetrafluoroborate ($LiBF_4$), lithium trifluoromethylsulfonate ($LiCF_3SO_3$), lithium bis(trifluoromethylsulfonyl)imide ($LiN(CF_3SO_2)_2$), lithium bis(pentafluoroethylsulfonyl)imide ($LiN(C_2F_5SO_2)_2$), lithium (trifluoromethylsulfonyl)(nonafluorobutylsulfonyl)imide ($LiN(CF_3SO_2)(C_4F_9SO_2)$), lithium tris(trifluoromethylsulfonyl)methide ($LiC(CF_3SO_2)_3$), and the like. These solutes may be used alone or in combination of two or more of them. In an embodiment, the solute may be included in the nonaqueous electrolyte in about 1 wt % to about 10 wt %.

The hybrid primary lithium battery may have any shape appropriately selected from, for example, a cylindrical shape, a prismatic shape, a sheet shape, a flat shape, and a laminate shape, in addition to a coin shape, depending upon the applications, and the like, of the lithium primary battery.

EXAMPLES

The copper (II) phthalocyanine ("CuPc") used was obtained from Sigma-Aldrich (>99.95%, triple-sublimed). The CuPc was prepared for use by drying at 100° C. overnight in a vacuum oven. The particle size was then decreased through the use of high intensity ball milling with a SPEX® SamplePrep 8000M Mixer/Mill. The CuPc was placed inside an alumina vial, and then ground for 3 hours. This process reduced the average particle diameter from the micron range to the nanometer range. The carbon monofluoride ($CF_x$) used was obtained from Sigma-Aldrich (graphite, fluorinated, polymer), and was used as received. The separator used was Celgard® 2300 and was dried at 50° C. overnight in a vacuum oven prior to use.

An exemplary hybrid primary lithium battery was produced in the CR2032 coin cell form factor. Dry pressing or solution casting is the two methods primarily used to produce the cathodes. For dry pressing, the cathode active material is prepared by weighing out the component materials in the desired quantities and then placed into a small vial and mixed in a Wig-L-Bug® (Dentsply International, Inc.) for 2 minutes. Two stainless steel platens are wrapped with kapton tape with carbon coated aluminum foil placed onto one side. The cathode active material is then spread evenly onto the aluminum foil, and pressed under 1000 pounds of pressure for 3 minutes at 150° C. The cathode active material is then inspected for uniformity, and the process repeated until the desired quality is obtained. For solution casting, the cathode active material is prepared by weighing out the component materials in the desired quantities and then placed into a small vial. An appropriate amount of solvent, typically n-methyl 2-pyrrolidone, is then added into the vial and the mixture is then stirred for an hour. The mixture is then cast onto carbon-coated aluminum foil using a doctor blade. The cast is then dried under dynamic vacuum at elevated temperatures overnight. For cell assembly, Celgard® 2300 is used as a separator, and 149 micron thick lithium foil is used as the anode. The cathode size is ⁹⁄₁₆" diameter, the separator size is ⅝" diameter, and the lithium foil is ½" diameter. The appropriate sizes are punched out using a circle punch with a rubber mallet. The coin cell includes 2 stainless steel spacers and a wave spring to fill in unused volume, and a polymer separation ring to prevent shorting of the cell between the top and bottom of the case. 60 microliters of lithium bis(fluorosulfonyl)imide in 1,2-dimethoxyethane is typically added as the electrolyte to the cell. The coin cell is then sealed by using a CR2032 crimper from Hohsen Corporation.

| Example | Cathode Composition (wt%) | Specific Capacity (mAh/g$_{active}$) | Comments |
|---|---|---|---|
| 1 | 30% CFx, 30% CuPc, 30% MWCNT, 10% PEO | 2173 | 50:50 wt% ratio of CFx to CuPc |
| 2 | 42% CFx, 18% CuPc, 30% MWCNT, 10% PEO | 2188 | 70:30 wt% ratio of CFx to CuPc |
| 3 | 18% CFx, 42% CuPc, 30% MWCNT, 10% PEO | 1356 | 30:70 wt% ratio of CFx to CuPc |
| 4 | 40% CFx, 40% CuPc, 10% MWCNT, 10% PEO | 1177 | 50:50 wt% ratio of CFx to CuPc |
| 5 | 100% CFx, 0% CuPc, 30% MWCNT, 10% PEO | 1203 | 100:0 wt% ratio of CFx to CuPc |
| 6 | 0% CFx, 100% CuPc, 30% MWCNT, 10% PEO | 994 | 0:100 wt% ratio of CFx to CuPc |
| 7 | 0% CFx, 0% CuPc, 90% MWCNT, 10% PEO | 200 | No active material |
| 8 | 42% CFx, 18% CuPc, 30% AB, 10% PEO | 1747 | 70:30 wt% ratio of CFx to CuPc |
| 9 | 42% CFx, 18% FePc, 30% AB, 10% PEO | 1527 | 70:30 wt% ratio of CFx to FePc |
| 10 | 42% CFx, 18% CuPc, 30% AB, 10% PVDF | 1465 | 70:30 wt% ratio of CFx to CuPc |
| 11 | 30% CFx, 30% CuPc, 30% AB, 10% PVDF | 1357 | 50:50 wt% ratio of CFx to CuPc |
| 12 | 42% CFx, 18% CuPc, 30% Graphene, 10% PVDF | 3092 | 70:30 wt% ratio of CFx to CuPc |

Table 1 is a list of capacities of selected lithium/CF$_x$:CuPc primary cells and other related cells.

Figure 2:
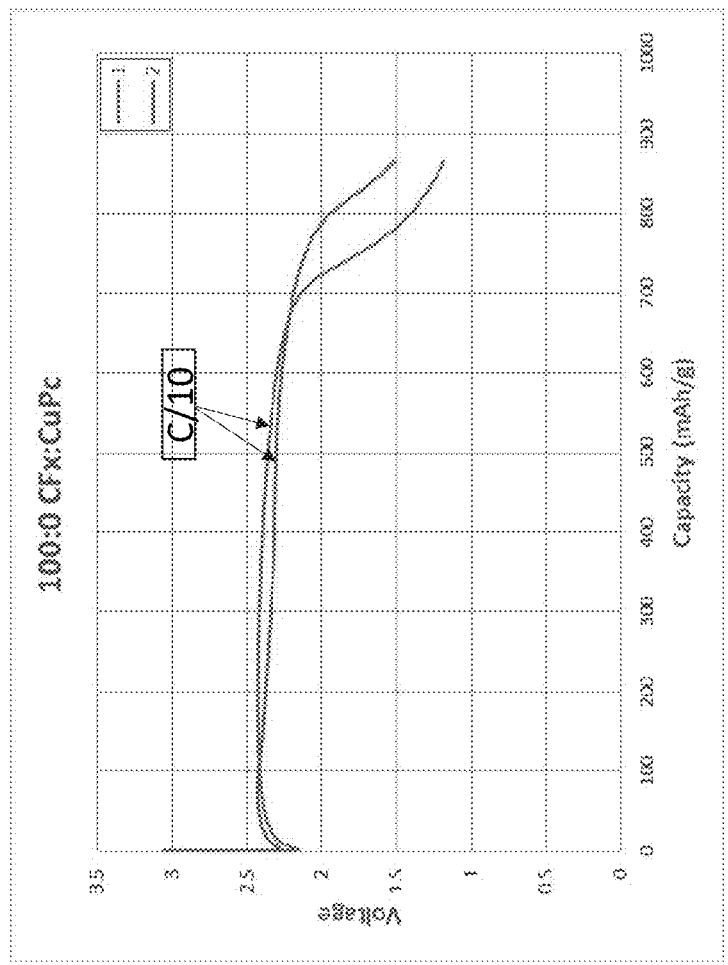
FIG. 2 is a plot of cell voltage versus cell capacity of a $CF_x$ battery void of phthalocyanines.

FIG. 2 is a plot of cell voltage versus cell capacity of two CF$_x$ cells void of phthalocyanines. Using 865 mAh/g of active material as the theoretical capacity for the CF$_x$, the rate of the constant current discharge is limited to a "C/10-rate" such that it will take ten hours for this capacity to discharged. The discharge ends either when a time of ten hours is reached or the cell voltage becomes 1.0 volts. The discharge profile of the two cells are similar in terms of voltage profile and cell capacity.

Figure 3:
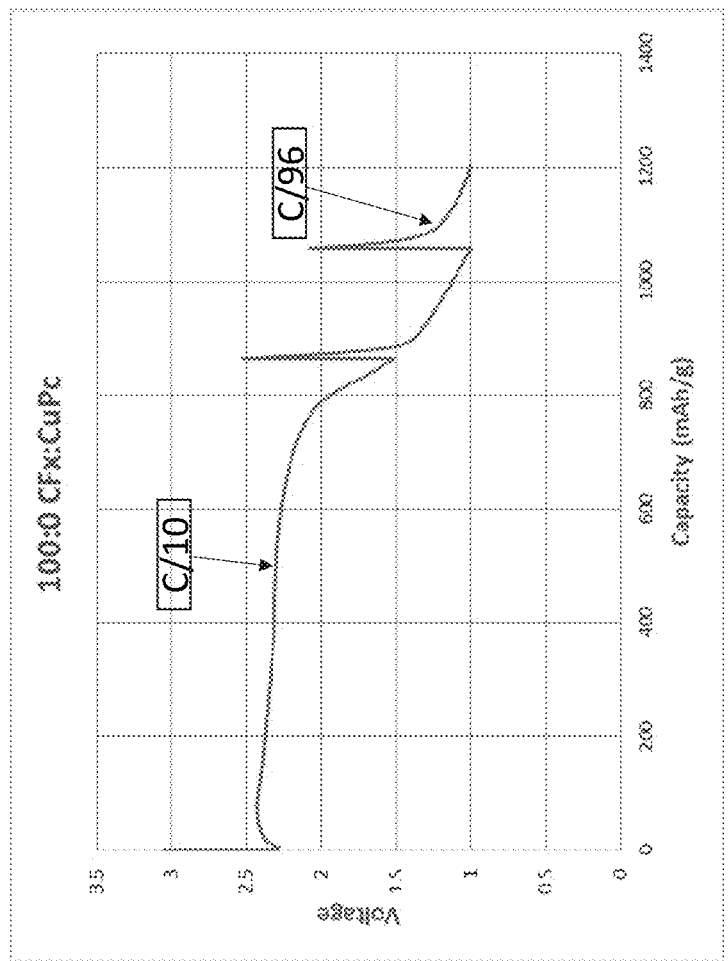
FIG. 3 is another plot of cell voltage versus cell capacity of a $CF_x$ battery void of phthalocyanines.

FIG. 3 is another plot of cell voltage versus cell capacity of a single CF$_x$ cell void of phthalocyanines. This cell was discharged first at a "C/10" constant current and it hit a capacity limit of 865 mAh/g of active material. It was discharged again at the "C/10" current rate until the cell voltage reached 1.0 volts. The cell was then subsequently discharged at a very low current rate of "C/96" to see what capacity could be obtained at a low discharge rate. Note that the total capacity of this cell which includes "C/10" and "C/96" discharge rates is about 1200 mAh/g of active material.

Figure 4:
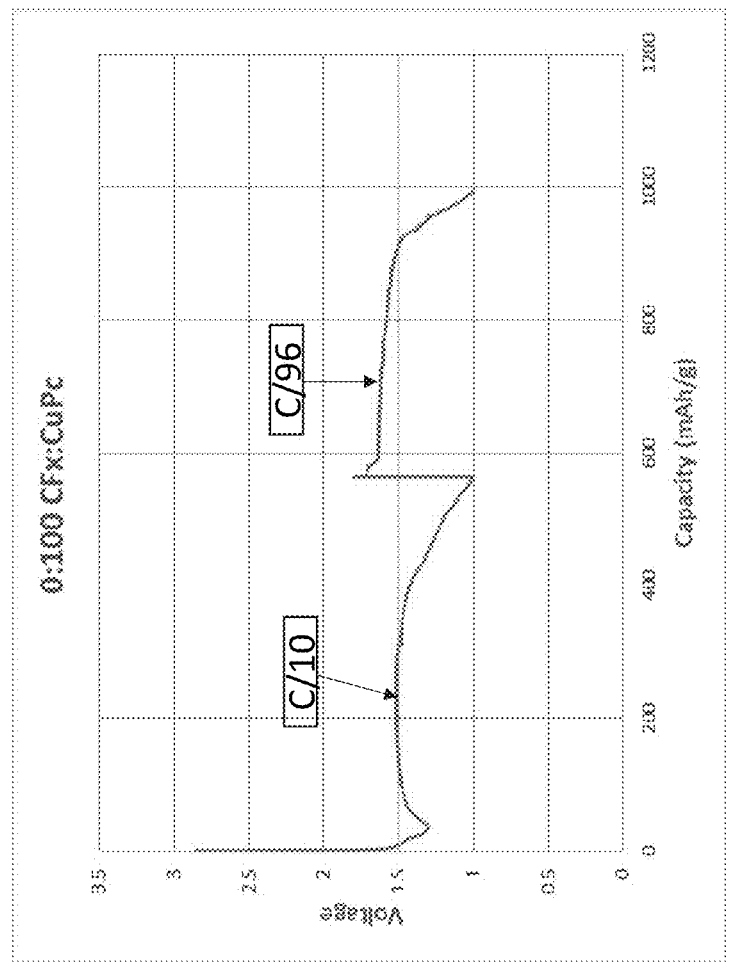
FIG. 4 is a plot of cell voltage versus cell capacity of a copper phthalocyanine battery void of $CF_x$.

FIG. 4 is a plot of cell voltage versus cell capacity of a single copper phthalocyanine cell void of CF$_x$. The "C/10" rate for the copper phthalocyanine active material is based on defining 930 mAh/g of active material as the active material capacity of copper phthalocyanine. The cell is first discharged at the "C/10" rate with a discharge voltage limit of 1.0 volts and a capacity limit of 930 mAh/g. The copper phthalocyanine rate capability is low and the cell discharge voltage limit is reached at about 550-600 mAh/g. The cell is then discharged at a low "C/96" current to see what the capacity of the cell is at low rates. The total subsequent capacity results in about 1000 mAh/g.

Figure 5:
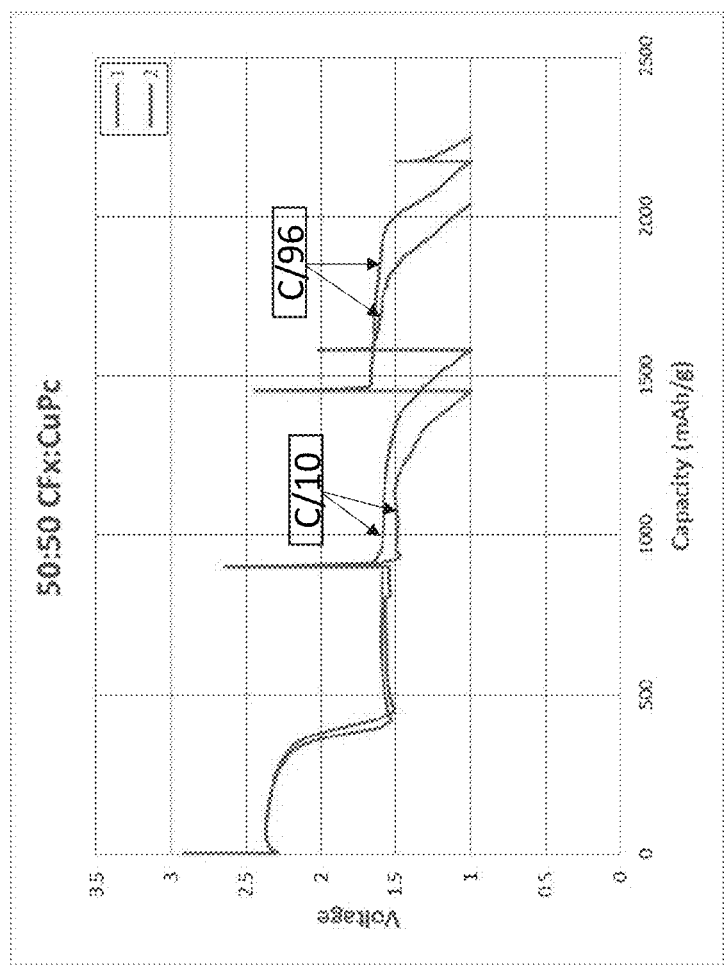
FIG. 5 is a plot of cell voltage versus cell capacity of a hybrid lithium primary battery comprising 50 parts $CF_x$ and 50 parts copper phthalocyanine, in accordance with an embodiment of the present invention.

FIG. 5 is a plot of cell voltage versus cell capacity of two hybrid lithium primary cells comprising 50 parts CF$_x$ and 50 parts copper phthalocyanine, in accordance with an embodiment of the present invention. The "C/10" rate here is defined here using the rule of mixtures of the CF$_x$ and the CuPc active materials which, for this case, is 898 mAh/g of active material. The first C/10 discharges for the two cells are similar in voltage shape and capacity and both reach the C/10 capacity limit. The second C/10 discharge for the two cells are also similar in nature and reach the 1.0 volt cell voltage limit at about 1500 mAh/g of active material. The residual capacity of the cells is then determined by a low current (C/96) discharge to a 1.0 volt cell cutoff. Approximately 2100 mAh/g of active material capacity is the result of these various discharges and are similar in nature. This illustrates the synergistic effect that occurs in combinations of CF$_x$ and CuPc.

Figure 6:
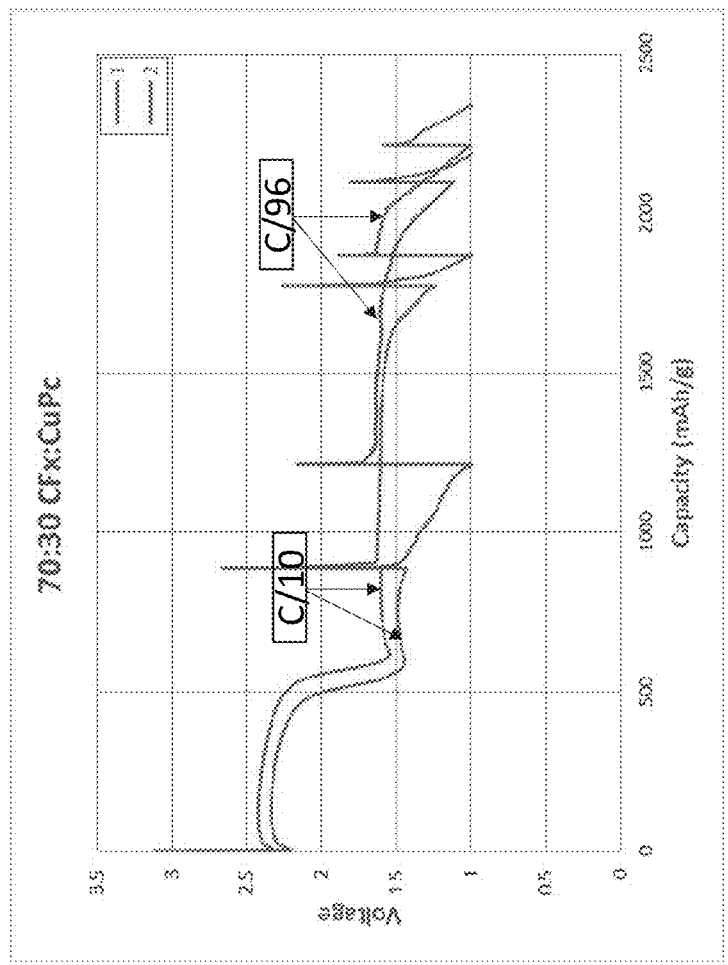
FIG. 6 is a plot of cell voltage versus cell capacity of a hybrid lithium primary battery comprising 70 parts $CF_x$ and 30 parts copper phthalocyanine, in accordance with another embodiment of the present invention.

FIG. 6 a plot of cell voltage versus cell capacity of two hybrid lithium primary cells comprising 70 parts CF$_x$ and 30 parts copper phthalocyanine, in accordance with another embodiment of the present invention. The C/10 rate here is based on an active material capacity of 884 mAh/g by the rule of mixtures. For the first C/10 discharge, the discharge voltage and capacity of the two cells are similar, although one cell seems to be performing slightly better than the other cell and both reach the C/10 capacity limit as opposed to the 1.0 cell voltage limit. With a second C/10 discharge, one cell under performs versus the other cell, however, with the addition of the low-rate C/96 residual capacity, both cells shows that their entire discharge capacity of about 2100 mAh/g is roughly the same.

Figure 7:
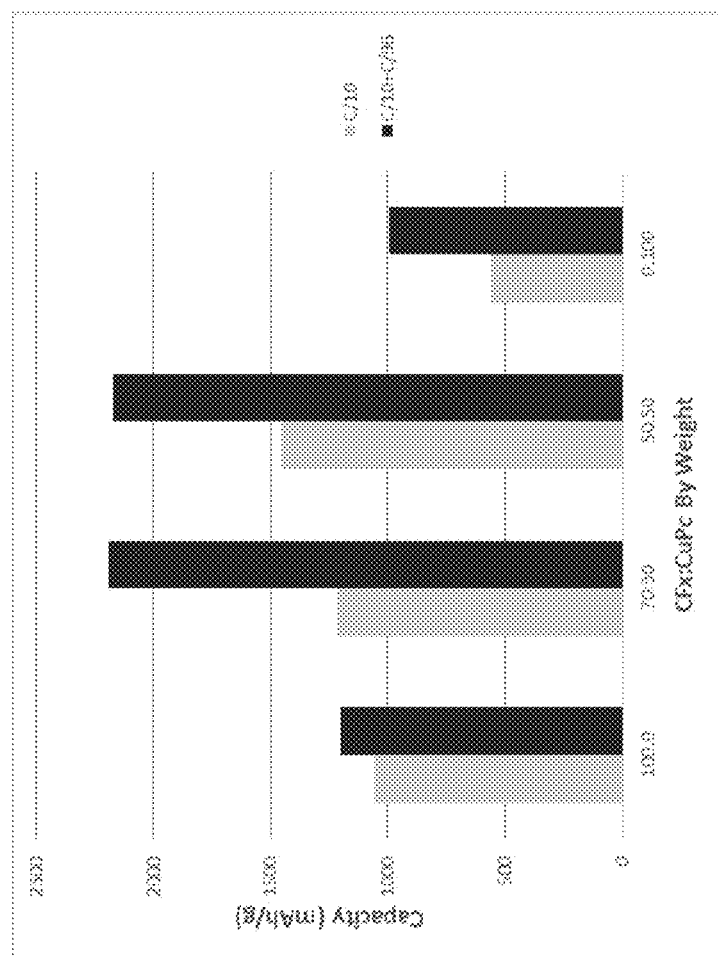
FIG. 7 is a bar graph comparing cell capacity of exemplary hybrid primary lithium batteries, a $CF_x$ battery void of phthalocyanines, and a copper phthalocyanine battery void of $CF_x$.

FIG. 7 is a bar graph comparing cell capacity of exemplary hybrid primary lithium batteries, a CF$_x$ battery void of phthalocyanines, and a copper phthalocyanine battery void of CF$_x$. Note that the capacity of the mixtures is much greater than the individual active material capacities thus, a synergistic effect occurs in terms of capacity occurs when the two materials are added.

Figure 8:
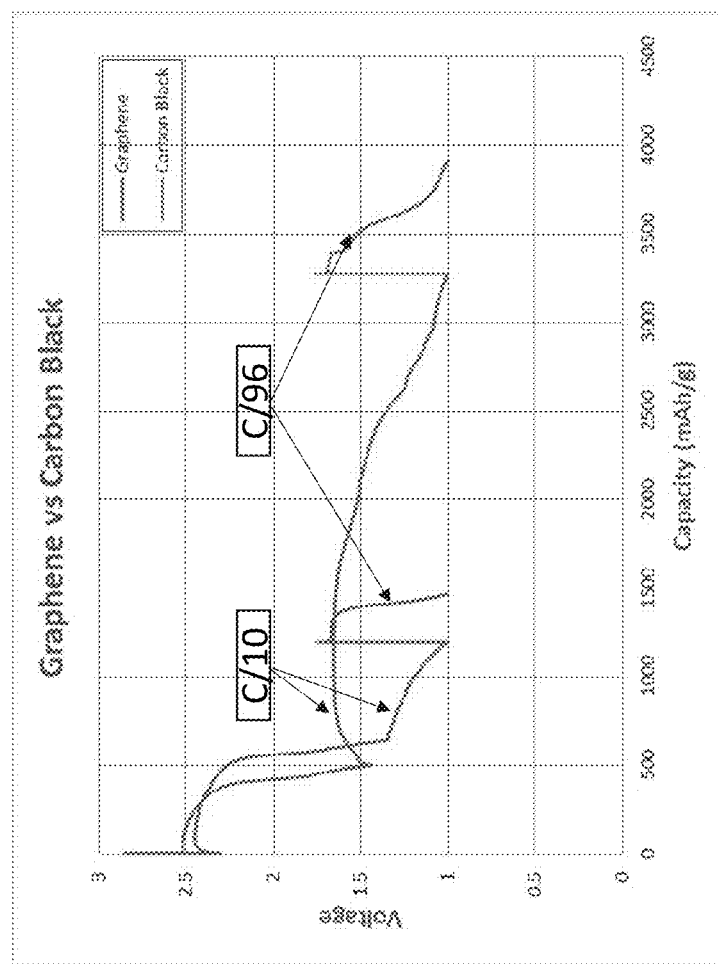
FIG. 8 is a plot of cell voltage versus cell capacity of exemplary lithium primary batteries comprising 70 parts $CF_x$ and 30 parts copper phthalocyanine, and comparing graphene versus carbon black as a carbon additive.

FIG. 8 is a plot of cell voltage versus cell capacity of two hybrid lithium primary cells comprising 70 parts CF$_x$ and 30 parts copper phthalocyanine and comparing the usage of graphene and carbon black as conductive additives, in accordance with embodiments of the present invention. These cells are first discharged at C/10 followed by a low rate C/96. The cell containing graphene shows slightly lower C/10 capacity in the initial CF$_x$ discharge portion, but shows a tremendous improvement in the CuPc portion when compared to the cell containing carbon black. This result indicates that the graphene is interacting with the CuPc as opposed to the CF$_x$, and that the interaction results in a large performance enhancement.

Figure 9:
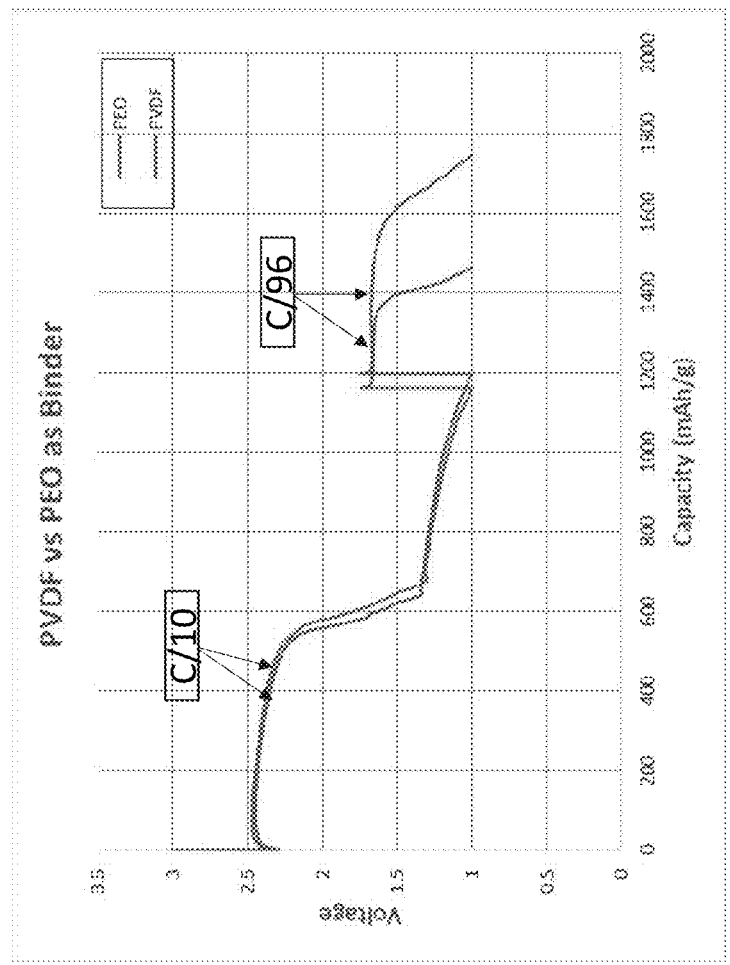
FIG. 9 is a plot of cell voltage versus cell capacity of exemplary lithium primary batteries comprising 70 parts $CF_x$ and 30 parts copper phthalocyanine, and comparing polyvinylidene difluoride versus polyethylene oxide as a binder.

FIG. 9 is a plot of cell voltage versus cell capacity of two hybrid lithium primary cells comprising 70 parts CF$_x$ and 30 parts copper phthalocyanine and comparing the usage of PVDF and PEO as conductive additives, in accordance with embodiments of the present invention. These cells are first discharged at C/10 followed by a low rate C/96. The two cells show almost identical capacity at the C/10 discharge rate, but the PEO cell outperforms the PVDF cell in terms of C/96 capacity.

Figure 10:
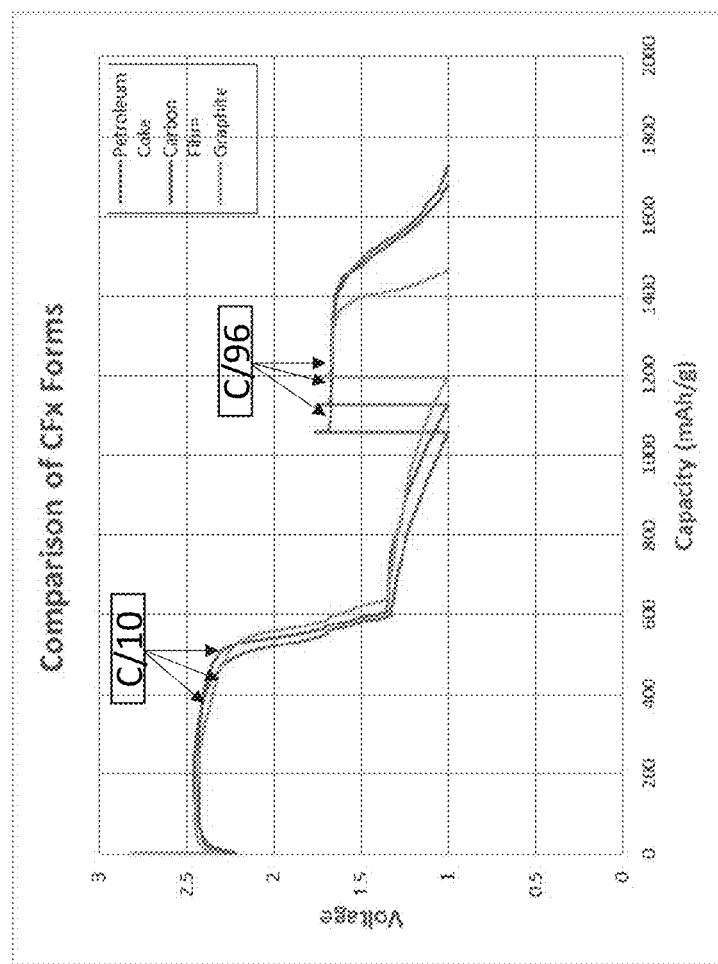
FIG. 10 is a plot of cell voltage versus cell capacity of exemplary hybrid lithium primary batteries comprising 70 parts $CF_x$ and 30 parts copper phthalocyanine, and comparing the performance of several forms of $CF_x$.

FIG. 10 is a plot of cell voltage versus cell capacity of three hybrid lithium primary cells comprising 70 parts CF$_x$ and 30 parts copper phthalocyanine and comparing the performance of different forms of CF$_x$, in accordance with embodiments of the present invention. The types of CF$_x$ differ in their carbon source, with graphite, petroleum coke, and carbon fibre being used. These cells are first discharged at C/10 followed by a low rate C/96. These cells show the graphite outperforms the petroleum coke and carbon fibre at the C/10 rate, but underperforms the two in total capacity when including the C/96 capacity.

Additionally, it is believed that a few of the limitations of a $CF_x$-only cathode may be due to significant heat generation and lack of state-of-charge indication due to the flatness of the discharge voltage. Accordingly, it is believed that the use of phthalocyanine may act to significantly reduce the amount of heat generation and may also provide a state-of-charge indication.

As used herein and in the appended claims, the singular forms "a", "an" and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A hybrid lithium primary battery, comprising:
   a cathode active material consisting essentially of a carbon monofluoride ($CF_x$) material and a phthalocyanine compound, wherein x is in a range from about 0.5 to about 3.0, wherein the phthalocyanine compound has an average particle diameter in a range from about 50 nm to about 500 nm, and wherein a weight ratio between the carbon fluoride material and the phthalocyanine compound is between about 1:20 to about 20:1;
   an anode active material consisting of lithium metal, a lithium alloy, or a combination thereof; and
   a porous separator interposed between the cathode active material and the anode active material.

2. The hybrid lithium primary battery of claim 1, wherein the phthalocyanine compound is selected from the group consisting of copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, and a combination thereof.

3. The hybrid primary battery of claim 1, wherein the cathode active material further comprises a conductive additive.

4. The hybrid primary battery of claim 3, wherein the conductive additive is selected from the group consisting of carbon black, acetylene black, single-walled carbon nanotubes, multi-walled carbon nanotubes, graphene, graphene oxide, and combinations thereof.

5. The hybrid primary battery of claim 1, wherein the cathode active material further comprises a binder.

6. The hybrid primary battery of claim 5, wherein the binder comprises a polymer.

7. The hybrid primary battery of claim 6, wherein the polymer is selected from the group consisting of polyethylene oxide, polyvinylidene fluoride, polyetrafluoroethylene and polyethylene, polyacrylic acid, and a combination thereof.

8. The hybrid primary battery of claim 1, further comprising an electrolyte.

9. The hybrid primary battery of claim 1, wherein the cathode active material further comprises a conductive additive and a binder.

10. The hybrid primary battery of claim 1, wherein x is in a range from ratio of about 0.95 to about 1.15.

11. The hybrid primary battery of claim 9, wherein the carbon fluoride material is present in an amount from about 5 wt % to about 95 wt %; wherein the phthalocyanine compound is present in an amount from about 5 wt % to 95 wt %; wherein the conductive additive is present in an amount from about 5 wt % to about 50 wt %; wherein the binder is present in an amount from about 1 wt % to about 15 wt %; and wherein wt % is based on a total weight of the carbon fluoride material, phthalocyanine compound, the conductive additive, and the binder.

12. The hybrid primary battery of claim 11, wherein x is in a range from about 0.95 to about 1.15; wherein the phthalocyanine compound comprises copper phthalocyanine; wherein the conductive additive comprises a carbon nanotube; and wherein the binder comprises polyethylene oxide.

* * * * *